(12) United States Patent
Prykäri et al.

(10) Patent No.: US 8,599,014 B2
(45) Date of Patent: Dec. 3, 2013

(54) METHOD AND APPARATUS FOR MANAGING NOTIFICATIONS

(75) Inventors: Tatu Jaakko Prykäri, Haukipudas (FI); Jussi Antero Jarvenpaa, Jaali (FI); Jokko Koronen, Ikkala (FI); Pete Paasivirta, Espoo (FI); Laura Emilia Oinas, Oulu (FI); Ilkka Kimmo Juhani Korhonen, Lempaala (FI); Peter L. Mikelsons, San Francisco, CA (US); Cynthia Y. Kuo, Mountain View, CA (US); Kenneth Tracton, Palo Alto, CA (US)

(73) Assignee: Nokia Corporation, Espoo (FI)

( * ) Notice: Subject to any disclaimer, the term of this patent is extended or adjusted under 35 U.S.C. 154(b) by 371 days.

(21) Appl. No.: 12/940,677

(22) Filed: Nov. 5, 2010

(65) Prior Publication Data

US 2012/0112908 A1 May 10, 2012

(51) Int. Cl.
*G08B 21/00* (2006.01)

(52) U.S. Cl.
USPC .......................................................... 340/540

(58) Field of Classification Search
USPC ............. 340/540, 309.7, 309.4, 407.1, 815.4, 340/384.1; 709/207
See application file for complete search history.

(56) References Cited

U.S. PATENT DOCUMENTS

| | | | |
|---|---|---|---|
| 8,024,415 B2 * | 9/2011 | Horvitz et al. | 709/207 |
| 2002/0087649 A1 * | 7/2002 | Horvitz | 709/207 |
| 2003/0131142 A1 * | 7/2003 | Horvitz et al. | 709/313 |
| 2004/0203643 A1 | 10/2004 | Bhogal et al. | |
| 2006/0025159 A1 | 2/2006 | Estevez et al. | |
| 2009/0037832 A1 * | 2/2009 | Falchuk et al. | 715/764 |
| 2009/0054039 A1 | 2/2009 | van Wijk et al. | |
| 2009/0075632 A1 * | 3/2009 | Urbahns | 455/412.2 |
| 2009/0099992 A1 * | 4/2009 | Horvitz | 706/46 |
| 2009/0247112 A1 | 10/2009 | Lundy et al. | |
| 2010/0274866 A1 * | 10/2010 | Hammad et al. | 709/207 |

FOREIGN PATENT DOCUMENTS

| | | |
|---|---|---|
| EP | 1569426 A1 | 8/2005 |
| WO | 2009097555 A2 | 8/2009 |

OTHER PUBLICATIONS

International Search Report and Written Opinion, received in corresponding Patent Cooperation Treaty Application No. PCT/FI2011/050956, dated Mar. 8, 2012. 13 pages.

Froehlich, Jon, "UbiGreen: Investigating a Mobile Tool for Tracking and Supporting Green Transportation Habits", CHI 2009, Boston, MA, Apr. 4-9, 2009, 10 pages.

* cited by examiner

*Primary Examiner* — Phung Nguyen
(74) *Attorney, Agent, or Firm* — Ditthavong Mori & Steiner, P.C.

(57) ABSTRACT

An approach is provided for managing and rendering notifications (i.e., notifications from one or more sources). A notification manager receives one or more requests for rendering one or more notifications at a device. In response to the one or more requests, the notification manager determines one or more notification policies at a device. Further, the notification manager determines one or more schedules for rendering the one or more notifications and causes, at least in part, rendering of the one or more notifications.

20 Claims, 13 Drawing Sheets

METHOD AND APPARATUS FOR MANAGING NOTIFICATIONS

BACKGROUND

Service providers and device manufacturers (e.g., wireless, cellular, etc.) are continually challenged to deliver value and convenience to consumers by, for example, providing compelling network services. One area of development has been the services and technologies for personal information management (e.g., calendaring, task management, goal planning, and the like) related to health and wellness applications, which further assist users in monitoring different aspects of their wellness and lifestyle targets. With multiple applications available on a user device, there is a need for an organized approach to monitor, manage and render notifications on a user device caused by different applications.

SOME EXAMPLE EMBODIMENTS

Therefore, there is a need for an approach for efficiently managing one or more notifications and rendering to a user for processing.

According to one embodiment, a method comprises determining to act on a request to render one or more notifications at a device. The method also comprises determining one or more notification policies associated with rendering the one or more notifications at the device. The method further comprises determining to generate one or more schedules for rendering the one or more notifications based, at least in part, on the one or more notification policies.

According to another embodiment, an apparatus comprises at least one processor, and at least one memory including computer program code, the at least one memory and the computer program code configured to, with the at least one processor, cause, at least in part, the apparatus to determine to act on a request to render one or more notifications at a device. The apparatus is also caused to determine one or more notification policies associated with rendering the one or more notifications at the device. The apparatus is further caused to determine to generate one or more schedules for rendering the one or more notifications based, at least in part, on the one or more notification policies.

According to another embodiment, a computer-readable storage medium carries one or more sequences of one or more instructions which, when executed by one or more processors, cause, at least in part, an apparatus determine to act on a request to render one or more notifications at a device. The apparatus is also caused to determine one or more notification policies associated with rendering the one or more notifications at the device. The apparatus is further caused to determine to generate one or more schedules for rendering the one or more notifications based, at least in part, on the one or more notification policies.

According to another embodiment, an apparatus comprises means for determining to act on a request to render one or more notifications at a device. The apparatus also comprises means for determining one or more notification policies associated with rendering the one or more notifications at the device. The apparatus further comprises means for determining to generate one or more schedules for rendering the one or more notifications based, at least in part, on the one or more notification policies.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for managing one or more notifications on a user device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to managing one or more notifications, it is contemplated that various embodiments of the approach described herein may be used with any other information object that can cause a notification, which may or may not require further processing by a user. Further, the notification can be activated based on; for example, time, location, people, activity, data, one or more user defined criteria, etc. For instance, in a common example of an alarm clock, the triggering criterion is the time at which the alarm is set to sound, render a visual alert and/or other types of notifications. Furthermore, content of a notification can be defined by a user, a user device, an application generating the notification, a network component, another user device and/or the like.

Additionally, various embodiments are discussed with respect to managing notifications originating from health or wellness applications. However, it is contemplated that the various embodiments of the approach described herein are applicable to any type of application, service, or process that can, at least cause to, generate a notification message or signal.

As used in the various embodiments of the approach described herein, a notification manager manages one or more notification on a user device, where the notifications are based on an event and which may or may not need further processing, information, actions, and the like from the user. The notifications can be caused by different applications and/or programs on a user device, by another user device, by a service provider and/or the like. For example, notifications can be caused by separate and distinct applications (e.g., a health and wellness application, a calendar application, a task management application, a note application, an e-mail application, an instant messaging application, a text messaging application, a social networking application, a location application, and/or the like). From the perspective of the user, receiving the one or more notifications may or may not be timely and/or necessary and can depend on one or more criteria set by the user and/or one or more applications. Therefore, a notification manager can manage the one or more notifications based on the one or more criteria.

Figure 1:
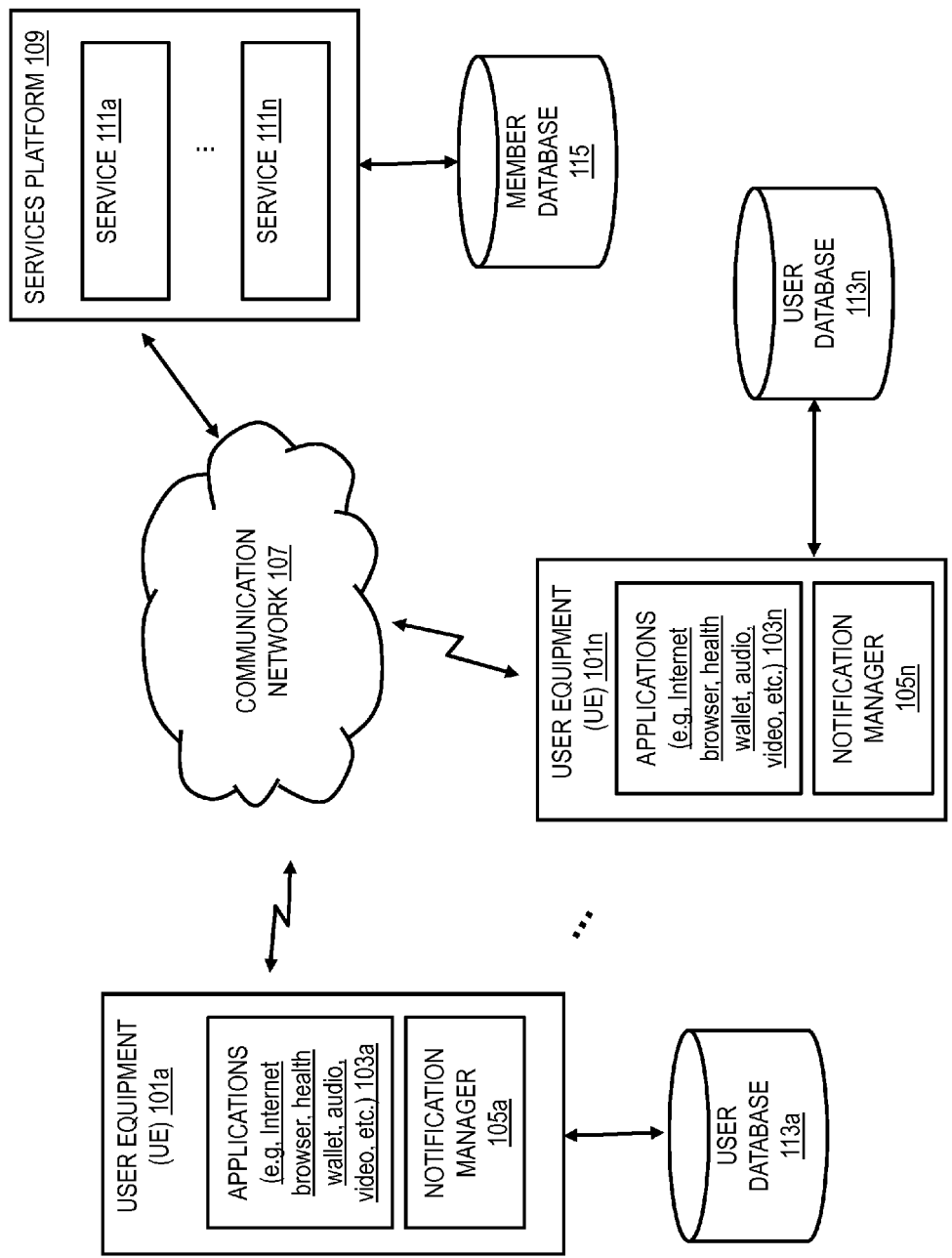
FIG. 1 is a diagram of a system capable of managing one or more notifications, according to an embodiment.

FIG. 1 is a diagram of a system capable of managing one or more notifications, according to an embodiment. As the number of applications (e.g., health and wellness monitoring applications, fitness applications, calendaring applications, task management applications, etc.) available on a user device grows, so does the number of possible notifications rendered to the user. Some of the applications provide solutions for organizing a user's life and produce one or more notifications for the user so that the user can track one or more targets, goals, tasks, etc., and take necessary actions. However, as there can be multiple notifications, it would be challenging for the user to manage the notifications without, at least, some organizational assistance at the device, for example, from an application to manage the notifications. Further, the notifications can substantially be displayed simultaneously regardless of the user and/or the device activity at the time when the notifications are to be rendered to the user.

As noted, a user may be rendered with one or more notifications on a user device, where the notifications may be caused by one or more applications on a user device, by one or more service providers, by one or more other user devices, by one or more network components, and/or the like. Further, the one or more notifications may occur independently from each other and/or one or more notifications may cause one or more other notifications. Furthermore, the one or more notifications may prompt the user to input data into the one or more notifications whereby the data can be transferred to one or more applications on the user device, to one or more other user devices, to one or more service providers, to one or more network components and/or the like. Moreover, the one or more notifications may be rendered to the user one at a time or one or more at a time. To address this issue, utilizing a notification manager application and/or widget, can assist in managing the one or more notifications. The notification manager can be implemented at an application level, at the device operating system level and/or as a top level application and/or widget to manage the one or more notifications. Moreover, at least, one of the notification manager's primary tasks would be to intercept notifications or notification requests from various applications and/or sources. In one scenario, instead of allowing each application cause one or more notifications to occur solely on criteria of an application, the notification manager coordinates the rendering of requested notifications by applying logic, criteria, and/or rules for translating a requested or intercepted notification to an actual notification to the user. For example, the notification manager can delay a requested notification until it detects a device idle state to minimize potential unwanted or unnecessary interruptions to the user. Additionally, the notification manager is to minimize interruptions by delaying, combining, or otherwise manipulating the notifications so that they are rendered in a way to avoid interrupting the user and/or the user device's tasks and when the user's attention can be focused on the notifications, thereby making the notifications more effective.

Further, the notification manager can substantially control the notification methods on the device, for example, according to notification type, according to one or more notification methods available on the device, according to notification method of the application causing the notification, according to user defined criteria and/or the like. Furthermore, the notification manager can, at least, cause to generate one or more notifications. In one embodiment, the notification manager intercepts the one or more notifications and schedules one or more renderings of the one or more notifications, at least in part, based on user activity. For example, the one or more renderings can be scheduled such that it substantially minimizes user disturbance by, at least, applying context sensitive intelligence. An example scenario would be to prioritize the one or more notifications and schedule the lower priority notifications for a later rendering to the user when the user activity is suitable for the one or more renderings (i.e., when the device indicates low user activity, user device in idle mode, and/or the like). Additionally, the rendering of the one or more notifications can be with controlled frequency (i.e., render one or more notifications once per hour, render one or more lower priority notifications with less frequency, render one or more notifications with higher priority every five minutes, etc.).

Additionally, the notification manger can further generate the notification using any familiar mode of communication on the device (e.g., SMS, IM, email, voicemail, etc.) in place of or in addition to normal notification delivery. In various embodiments, to save network bandwidth and user device resources (i.e., battery power, network time, etc.), the notification manager may generate the notifications without accessing a communication network. In other words, the notification manager can interact with the device's native messaging, communication, and/or notification systems to directly deliver the notification in a selected mode of communication to the appropriate messaging application (e.g., messaging inbox). To the user, the notification would appear in one of the user device's communication inboxes as if it were a regular network message, whereas in implementation, the notification was locally delivered to the inbox (e.g., via a corresponding application programming interface (API)).

In general, for one or more notifications to be more user friendly, easier to understand, easier to process and act on, the notifications should be organized, rendered independently, rendered in a group; grouped by type, priority, relevance, etc.; sorted by one or more criteria and/or the like. In the context of health and wellness applications, examples of notifications include notifications related to sleeping time, wakeup time; measure weight, blood pressure, blood glucose, pulse, etc; and/or the like. Further, the one or more notifications may be capable of rendering an interface, substantially included in the notification, to allow for actions and/or processing by the user without the need for the user to interface with source (i.e., an application) of the one or more notifications. For example, the user may be able to enter one or more data (i.e., blood pressure measurement) into the notification interface, which then transfers the data to one or more applications on the device, to the service provider, to a network component and/or the like.

As noted, the system 100 of FIG. 1 introduces the capability to manage one or more notifications and/or, at least, cause one or more notifications on a user device. It is noted that although several embodiments of the invention are discussed with respect to notification management, it is recognized by one of ordinary skill in the art that the embodiments of the inventions have applicability to any entity (e.g., both users and non-users of the notification) for initiating the causing of the notification. For example, a service provider, network operator, content provider, and the like may create a notification for the user. In particular, a service provider may, for instance, create notifications as a way of communicating to all or some groups of users (e.g., communicating service updates, new functionalities, marketing information, etc.). Also, a service, service provider, or other authorized entity may create notifications on behalf of the user, for instance, based on the user's criteria.

In the various embodiments of approach described herein, the notification manager of the system 100 supports the capability of monitoring and managing one or more notifications caused by one or more applications render on the user device and/or received from another source. The one or more notifications can have one or more parameters associated with the notifications, which can specify one or more policies for rendering the one or more notifications to the user. For instance, the policies can set for a notification method such as sounding an alert, rendering a visual alert (i.e., lights, reminder note, etc.), tactile alert (i.e., vibration in the user device), send a note via a short message service (SMS), send an email, send a voicemail, send an instant message (IM), where the one or more notifications can be caused by the user device and can be delivered to the user utilizing only the user device and/or in conjunction with one or more network components and/or one or more other user devices and/or the like. Further, the one or more notifications may need to be rendered to the user upon one or more specific events such as a user activity, a device activity, location of the user and/or the user device, time, date, and/or the like. Furthermore, the one or more notifications may indicate different priority levels, may require to be rendered in a certain order in reference to one or more other notifications and/or the like. This is especially true for information events which can start with a casual comment between two people and evolve into a planned event among many people. Moreover, the notification manager can create a log/history of the one or more notifications for later user by the notification manager and/or the user.

In certain scenarios, the one or more notifications may have a time-critical factor which may need to be addressed upon being activated. For example, a health and wellness related notification may require the user to take certain actions, respond to the notification, and input one or more data into the notification interface so that the application which generated the notification can further process the notification. In another scenario, one or more notification may have some flexibility in being processed. For example, if the user and/or the user device are involved in certain activities (creating an email, instant messaging, software update, internet browsing, etc.), one or more notifications can be put on hold until the user and/or the user have completed the activity so that the user and/or the user device are not interrupted. For example, the system 100 monitors contextual information associated with a user's device and then renders one or more notifications based on the contextual information.

In one embodiment, the system 100 can process one or more notifications, but render the one or more notifications substantially individually to the user. For example, there may be one or more active notifications, which the notification manager can process and render to the user one at a time so that the user can take necessary actions, if any, on any given notification. The order for rendering the one or more notifications can be based on criteria set by the user, by the user device, by the application causing the notification, by another user device, by one or more network components, and/or the like.

In another embodiment, the system 100 can process one or more notifications and render the one or more notifications to the user organized into one or more groups. For example, the one or more notification can be organized into one or more groups for rendering to the user. In one scenario, the grouping can be based on the priority levels of the one or more notifications, for example, a grouping of priority one notifications, a grouping of priority two notifications, and/or the like. In another scenario, the one or more notification can be grouped by the context of each notification. For example, health and wellness related notifications can be grouped into one or more groups and/or subgroups, fitness related notifications can be grouped into one or more groups and/or subgroups and/or the like. For instance, health and wellness related notifications can be grouped into a grouped and further into one or more subgroups, for example, by priority level, relevance (i.e., blood pressure, glucose level, etc.).

In another embodiment, the system 100 can process the one or more notifications and utilize one or more settings for rendering the one or more notifications to the user. In one scenario, notification method is set by the user device, for example, audio alert, visual alert, vibration in the device, etc. In another scenario, the notification method is set by the application generating a notification, for example, rendering a user interface menu on the user device whereby the user can interact with the menu. In another scenario, the notification method is based on the priority and/or the type of notification, for example, a priority one notification, a health and wellness related notification, and/or the like.

In another embodiment, the one or more notifications are delivered via one or more methods available on the user device. For example, the one or more notifications can be delivered via a SMS, via an email, via a voicemail and/or the like. Further, the one or more notifications can be delivered in participation with and/or without one or more network components such as a network server, network receiver, network transmitter and/or the like.

In one sample use case, John is a busy office manager who wants to get in shape and utilizes a fitness application to keep track of his daily exercise while monitoring his blood pressure. The application renders one or more notifications during the day for John to input data regarding his exercise and blood pressure measurement. The fitness application generates one or more notifications based on preset criteria. The notification manager monitors and receives the one or more notifications and schedules rendering of the one or more notifications while considering John's activity, user device activity, fitness application notification settings, user device notification settings, user preferences related to notification alerts and/or the like. Once the criteria for rendering one or more notifications to John are met, the one or more notifications are rendered to John and any data input by John are transferred to one or more applications on the user device, on one or more other user devices, on one or more network components and/or the like.

As shown in FIG. 1, the system 100 comprises user equipment (UEs) 101a-101n having connectivity to a service platform 109 via a communication network 107. In one embodiment, the notification manager 105 facilitates the monitoring, coordination, organization, rendering, and/or generation of one or more notifications. As noted previously, the notifications may be created by one or more applications 103 on one or more UEs 101, by the service platform 109, by the communication network 107 and/or the like having one or more triggering criteria (e.g., time, activity, location, people, etc.).

The notification manager 105 also facilitates the subsequent access and/or manipulation of the one or more notifications and any corresponding communications with one or more applications (e.g., applications 103a-103n) executed by the UEs 101a-101n or by one or more of the services 111a-111n (also known collectively as services 111) of the service platform 109 and/or the communication network 107. In one embodiment, the services 111 include a suite of services such as a location management service (e.g., a mapping service or navigation service), health, wellness, fitness, contact management service, messaging service, social networking service, media content service (e.g., music service, video service, etc.). In another embodiment, the notification manager 105 may initiate corresponding actions or functions provided by the applications 103, the services 111, and/or any other services available over the communication network 107 related to the notification management in various embodiments of the approach described herein. In addition or alternatively, the notification manager 105 may operate a web server to facilitate access to and/or manipulation of the notifications using a web browser executed on one or more of the UEs 101.

The one or more notifications are stored at one or more user database 113 and/or at one or more member database 115. In addition or alternatively, the user database 113 and/or the member database 115 can reside on one or more nodes connected directly or indirectly to one or more of the services 111. In other embodiments, the user database 113 and/or the member database 115 reside at one or more nodes in the network 107. More specifically, the user database 113 and/or member database include one or more processes and/or one or more data structures that store one or more notifications, and related information as well as data, configurations, user profiles, variables, conditions, and the like associated with operation of the notification manager 105. The notification manager 105 may also organize any generated notifications into one or more electronic notebooks whereby these notebooks can then be shared among one or more other users. By way of example, the notebooks may be assigned attributes (e.g., work, home, personal, private, etc.) that direct how and with whom the notebook is shared. The users can view these notebooks of notifications themselves in, for example, a contextually based graphical user interface. The notification manager 105 may also access the electronic notebooks to generate contextually appropriate notifications.

The graphical user interface can further depict underlying relationships between the information in the notifications to enable the user to more easily exploit the information and manage the large amount of complex information contained in one or more notification across one or more applications, one or more service platforms and or communication networks. By enabling effective associative browsing through connections or notifications, the notification manager 105 can help users set notifications, reminders, achieve goals, complete tasks, and discover new types of information. In addition, the exploration of links and connections between notifications may potentially improve the relevance of contextual notifications, related tasks, required data made by the notification manager 105.

Figure 6:
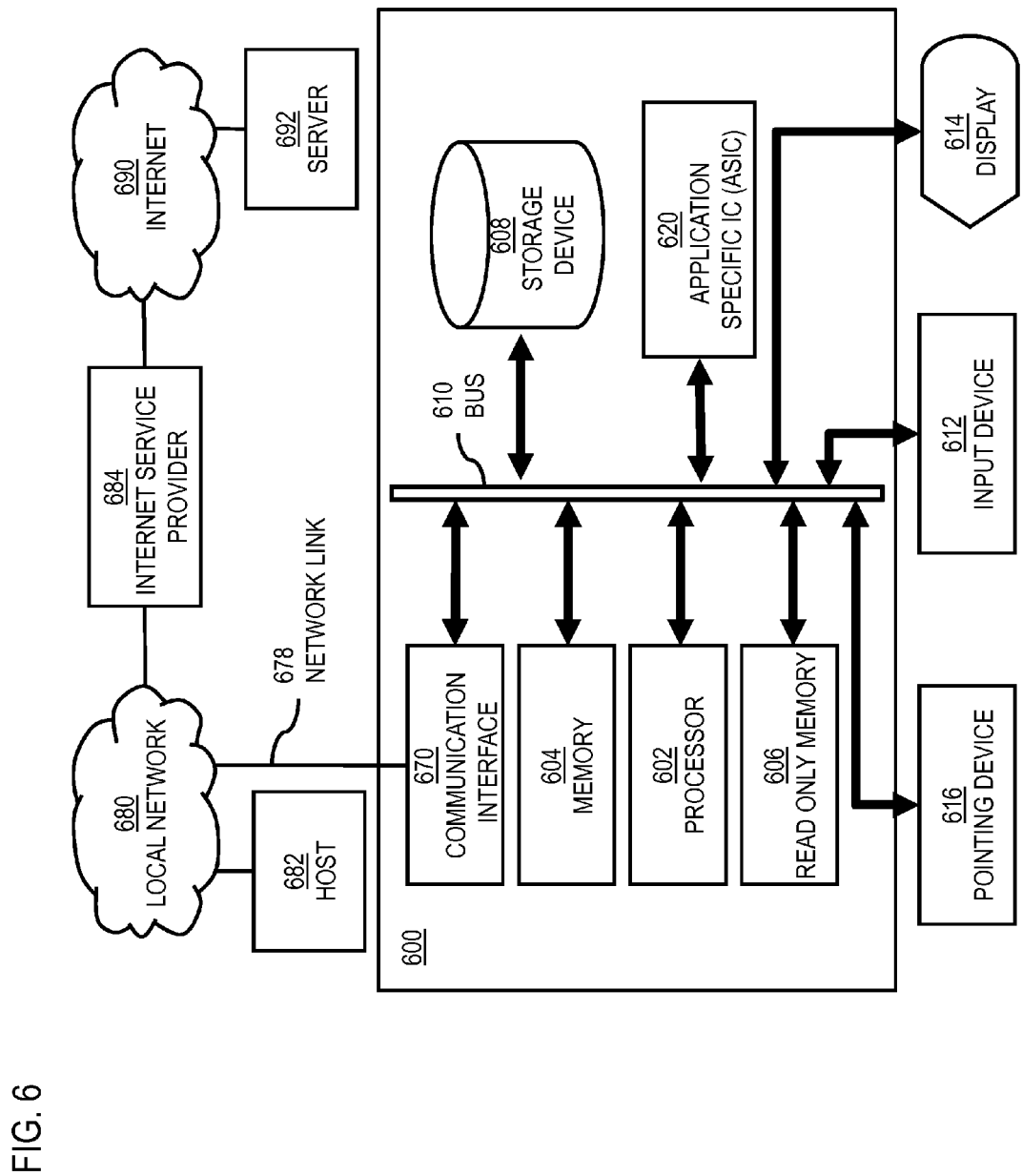
FIG. 6 is a diagram of hardware that can be used to implement an embodiment of the invention.

In one embodiment, the notification manager 105 and the service platform 109 can be implemented via shared, partially shared, or different computer hardware (e.g., the hardware described with respect to FIG. 6).

By way of example, the communication network 107 of the system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UEs 101 are any type of mobile terminal, fixed terminal, or portable terminal including a mobile handset, station, unit, device, multimedia tablet, multimedia computer, Internet node, communicator, desktop computer, laptop computer, Personal Digital Assistants (PDAs), or any combination thereof. It is also contemplated that the UE 101 can support any type of interface to the user (such as "wearable" circuitry, etc.). The UE 101 may also be equipped with one or more sensors (e.g., a global positioning satellite (GPS) sensor, accelerometer, light sensor, etc.) for use with the services 111a-111n.

By way of example, the UEs 101 and the service platform 109 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the notification manager 105 and the services platform 109 communicate and interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. In one embodiment, the server is integrated as part of the client.

Alternatively, the user may access the functions of the notification manager 105 via an access control application (e.g., the notification application 105) in the UE 101 such as a widget, according to another embodiment. Widgets are light-weight applications, and provide a convenient means for rendering information and accessing services. It is contemplated that the functions of these components may be combined in one or more components or performed by other components of equivalent functionality. Further, to avoid data transmission costs as well as save time and battery power, its control logic can fetch notifications cached or stored in its own database 113, without requesting data from any servers or external platforms, such as the communication network 107 and/or the service platform 109. Furthermore, during application idle time, any further communications with other devices (i.e., health, wellness, fitness, measurement, monitoring, etc) can be suspended to save device resources (e.g., battery power, processing resources, etc.).

Figure 2:
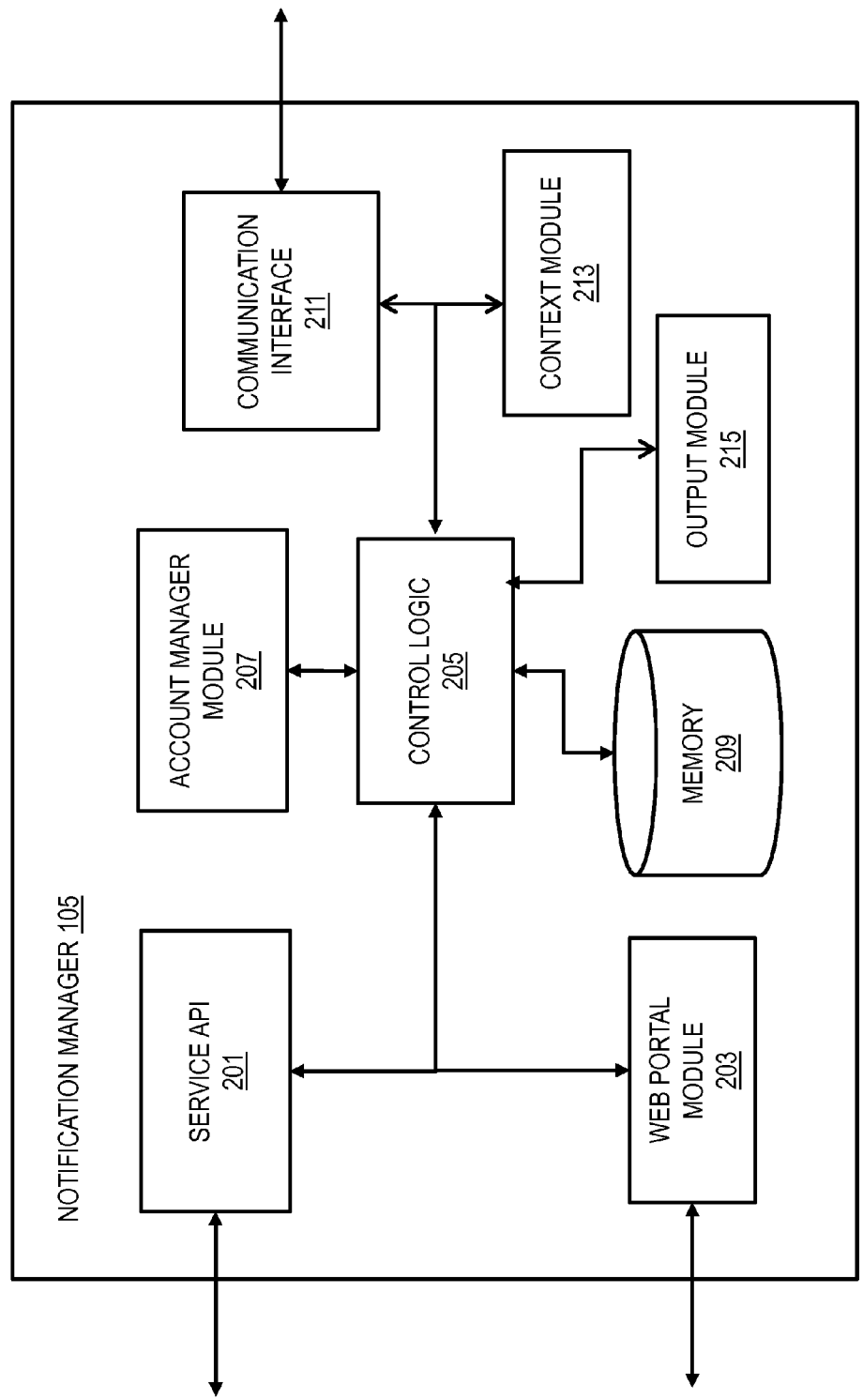
FIG. 2 is a diagram of the components of a notification manager, according to an embodiment.

FIG. 2 is a diagram of the components of a notification manager, according to one embodiment. By way of example, the notification manager 105 includes one or more components for managing, rendering, and/or causing to generate one or more notifications to a user. It is contemplated that the functions of these components may be combined in one or more components or performed by other components of equivalent functionality. In this embodiment, the notification manager 105 includes a service API 201, a web portal module 203, control logic 205, an account manager module 207, memory 209, a communication interface 211, and a context module 213.

The control logic 205 can be utilized in controlling the execution of modules and interfaces of the notification manager 105. The program modules can be stored in the memory 209 while executing. A communication interface 211 can be utilized to interact with UEs 101 (e.g., via a communication network 105) and/or services platform 109. Further, the control logic 205 may utilize the service API 201 (e.g., in conjunction with the communication interface 211) to interact with applications 103 and/or other applications, platforms, and/or the like.

The communication interface 211 may include multiple means of communication. For example, the communication interface 211 may be able to communicate over SMS, internet protocol, instant messaging, voice sessions (e.g., via a phone network), or other types of communication. The communication interface 211 can be used by the control logic 205 to communicate with the UEs 101*a*-101*n*, and other devices (i.e., blood pressure measuring device, weight measuring device, glucose measuring device, etc.). In some examples, the communication interface 211 is used to transmit and receive information using protocols and methods associated with the service API 201.

By way of example, the account manager module 207 may be utilized to handle users of the services platform 109 as well as any data associated with the users. As such, the account manager module 207 may validate user logins, manage user information (e.g., name, date of birth, gender, member id, schedules, social network group associations, etc.), generate notifications to send to the UEs 101 via the communication interface 211 and/or API 201, etc. Moreover, the account manager module 207 may coordinate with a web portal module 203 to facilitate access to the social service platform 103. As such, the web portal module 203 can generate a webpage and/or a web access API to allow UEs 101 to access the services platform 109.

The context module 213 enables the notification manager 105 to automatically determine attributes (e.g., location, people, time, etc.) of the notification that can be retrieved from either one or more of the services 111 of the services platform 109 and/or a sensor included in the UE 101 associated with the user. By way of example, place attributes can be set via navigation of places specified in the user's contact list or through a maps database or determined by a location-based sensor (e.g., GPS satellite receiver). In this case, the user can select or enter a location for recognition by the context module 213. It is contemplated that the one or more notifications may be associated with any number of locations. In one embodiment, the context information may also be used to direct the functioning and/or operation of a notification. Further, the notification manager 105 causes, at least in part, rendering of the one or more notifications via the control logic 205 and output module 215.

In one embodiment, the output module 215 facilitates a creation and/or a modification of at least one device user interface element, at least one device user interface functionality, or a combination thereof based, at least in part, on information, data, messages, and/or signals resulting from any of the processes and or functions of the notification manager 105 and/or any of its components or modules. By way of example, a device user interface element can be a display window, a prompt, an icon, and/or any other discrete part of the user interface presented at, for instance, the UE 101. In addition, a device user interface functionality refers to any process, action, task, routine, etc. that supports or is triggered by one or more of the user interface elements. For example, user interface functionality may enable speech to text recognition, haptic feedback, and the like. Moreover, it is contemplated that the output module 215 can operate based at least in part on processes, steps, functions, actions, etc. taken locally (e.g., local with respect to a UE 101) or remotely (e.g., over another component of the communication network 107 or other means of connectivity).

Additionally, the notification manger can further generate the notification using any familiar mode of communication on the device (e.g., SMS, IM, email, voicemail, etc.) in place of or in addition to normal notification delivery. In various embodiments, to save network bandwidth and user device resources (i.e., battery power, network time, etc.), the notification manager may generate the notifications without accessing a communication network. In other words, the notification manager can interact with the device's native messaging, communication, and/or notification systems to directly deliver the notification in a selected mode of communication to the appropriate messaging application (e.g., messaging inbox). To the user, the notification would appear in one of the user device's communication inboxes as if it were a regular network message, whereas in implementation, the notification was locally delivered to the inbox (e.g., via a corresponding application programming interface (API)).

Figure 3:
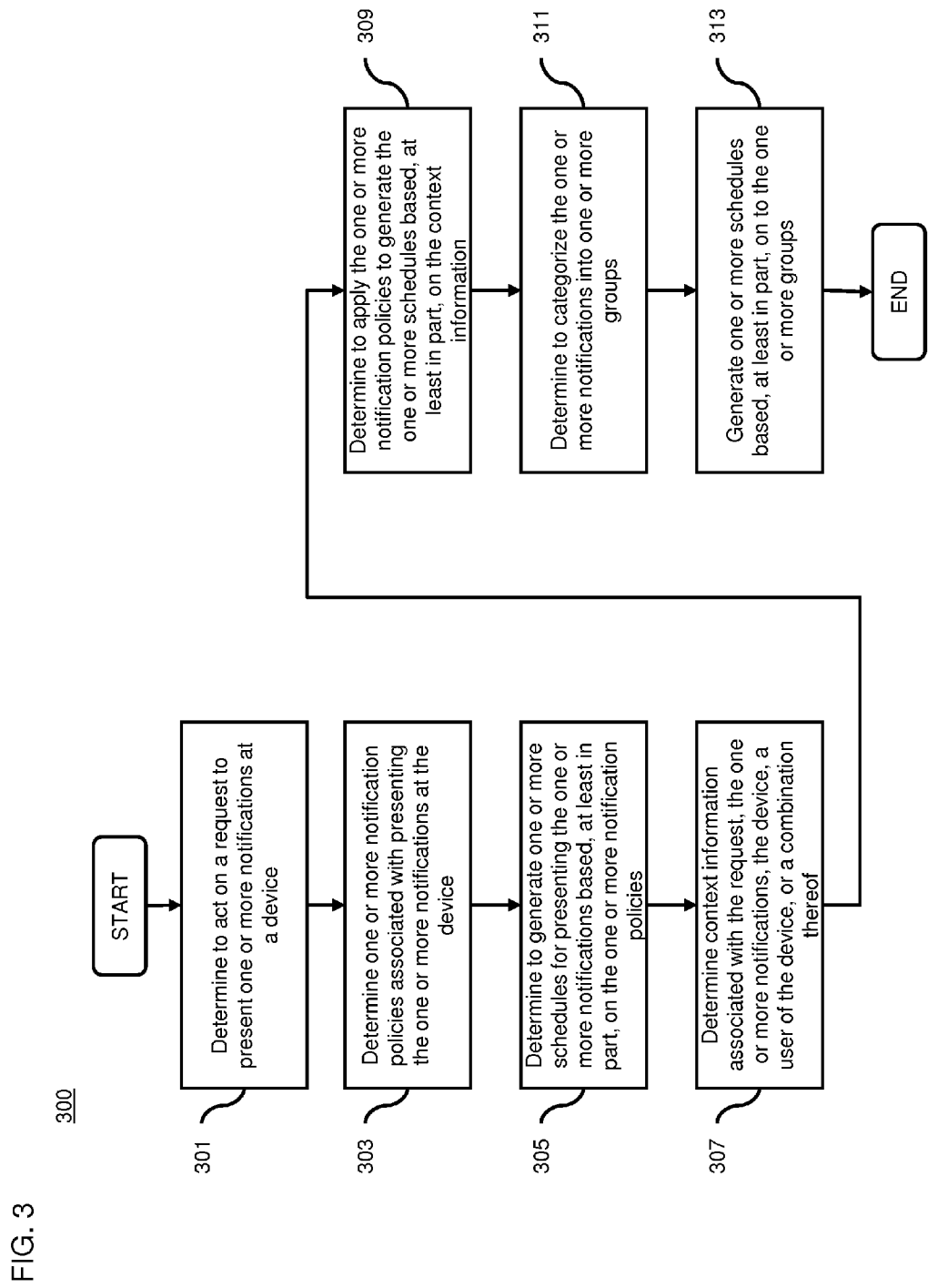
FIG. 3 is a flowchart of a process for managing one or more notifications, according to an embodiment.
Figure 7:
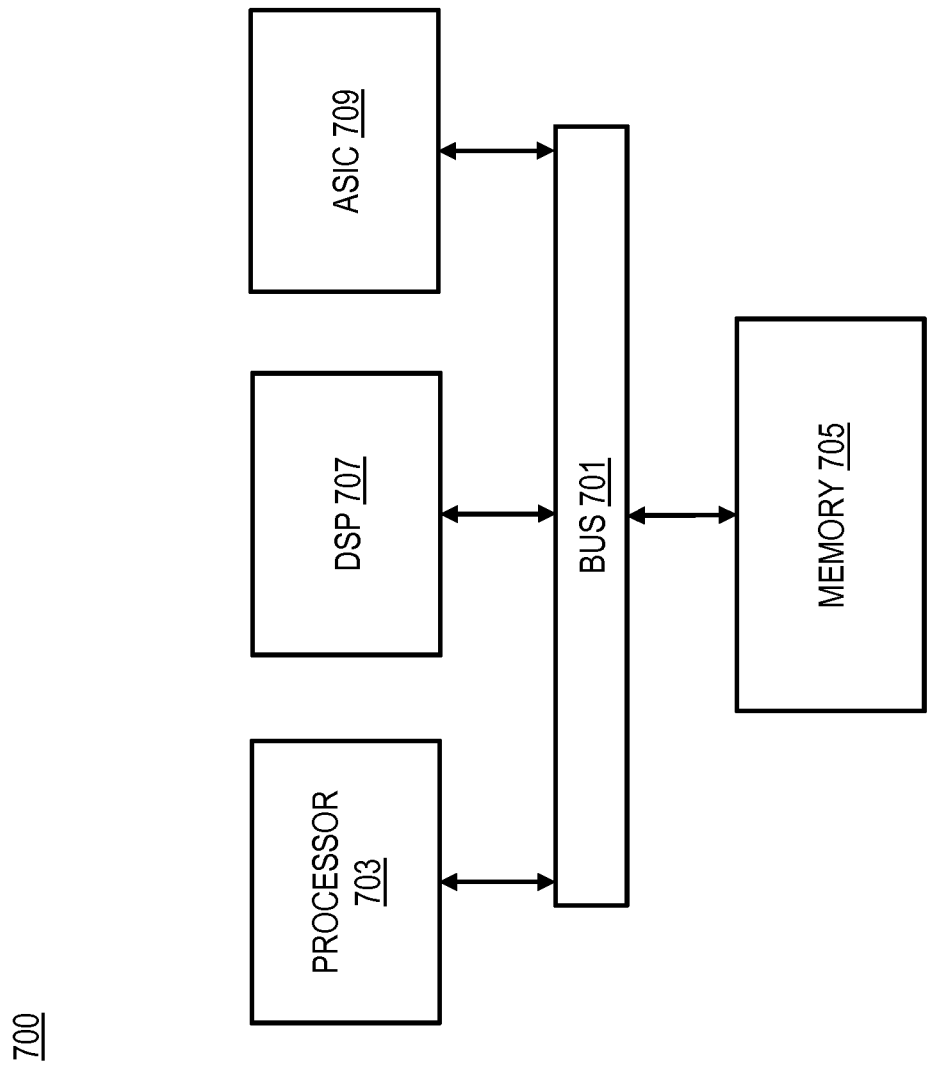
FIG. 7 is a diagram of a chip set that can be used to implement an embodiment of the invention.

FIG. 3 is a flowchart of a process for managing and organizing one or more notifications for a user, according to one embodiment. In one embodiment, the control logic 205 and/or other components of the notification manager 105 performs the process 300 and is implemented in, for instance, a chip set including a processor and a memory as shown in FIG. 7. As such, the control logic 205 can provide means for accomplishing various parts of the process 300 as well as means for accomplishing other processes in conjunction with other components of the notification manager 105.

In step 301, the control logic 205 determines to act on a request, e.g., from an application on UE 101, to render one or more notifications at a device. As mentioned above, an application on UE 101 (e.g., a health and/or wellness application) may at least cause generation of one or more notifications for rendering to the user. The one or more notifications can be triggered based on one or more criteria of the application, of the user, of the user device, of the service platform, of the user and/or user device activity, and/or the like. Moreover, at least, one of the notification manager's primary tasks would be to intercept notifications or notification requests from various applications and/or sources. In one scenario, instead of allowing each application cause one or more notifications to occur solely on criteria of an application, the notification manager coordinates the rendering of requested notifications by applying logic, criteria, and/or rules for translating a requested or intercepted notification to an actual notification to the user. For example, the notification manager can delay a requested notification until it detects a device idle state to minimize potential unwanted or unnecessary interruptions to the user. Additionally, the notification manager is to minimize interruptions by delaying, combining, or otherwise manipulating the notifications so that they are rendered in a way to avoid interrupting the user and/or the user device's tasks and when the user's attention can be focused on the notifications, thereby making the notifications more effective.

The control logic 205 may then, as in step 303, determine one or more notification policies associated with rendering the one or more notifications at the device. In one embodiment, the one or more policies are defined by one or more applications, by the user, by the user device, by the service platform and/or the like. The notification manager determines which policy to utilize for management of the one or more notifications and for rendering of the one or more notifications to the user. The control logic may further, as in step 305, determine to generate one or more schedules for rendering the one or more notifications based, at least in part, on the one or more notification policies. In another embodiment, the notification manager analyzes criteria such as the one or more notification policies, contextual information of the user and/or the user device activity, location information of the user and/or the user device, priority level of the one or more notifications, user device conditions, sensory information on user device and/or the like.

In step 307, as in certain embodiments, the control logic 205 determines context information associated with the request, the one or more notifications, the device, a user of the device, or a combination thereof. Further, in step 309, the control logic 205 determines to apply the one or more notification policies to generate the one or more schedules based, at least in part, on the context information. In an embodiment, the notification manager 105, determines one or more schedules of notification rendering to the user based, at least in part, on information related to the one or more requests, for example; source of the request, i.e., a health and wellness application, a fitness application, etc; type of notifications, priority of the one or more notifications; the device information, i.e., battery condition, network connectivity condition, maintenance condition, software version, etc.; user information (i.e., location information, use activity, user mood, etc.).

In step 311, the control logic 205, determines to categorize the one or more notifications into one or more groups and in step 313, the one or more schedules are generated based, at least in part, on to the one or more groups. As noted above, there can be one or more sources for one or more notification rendering requests, i.e., from one or more applications on one or more user devices, from one or more service platforms and/or the like. Further, the one or more notification may have one or more similar criteria, i.e., priority level, context of information provided in the notification, similar source application (i.e., health and wellness application, fitness application, etc.), type of information requested by the notification, method of notification rendering, and/or the like. Furthermore, the notification manager utilizes, at least in part, the one or more criteria to group the one or more notifications and schedule one or more renderings to the user. In another embodiment, the one or more notification requests are grouped into one notification per group and one or more rendering schedules are determined. In one embodiment, the notification manager determines if an action by the user and/or the device required and then renders an appropriate user interface to the user including the notification information. In another embodiment, the notification manager, at least in part, causes sensory communication with one or more other devices and capturing of one or more required data for the notification and includes the sensory data with rendering of the one or more notifications to the user.

Figure 4:
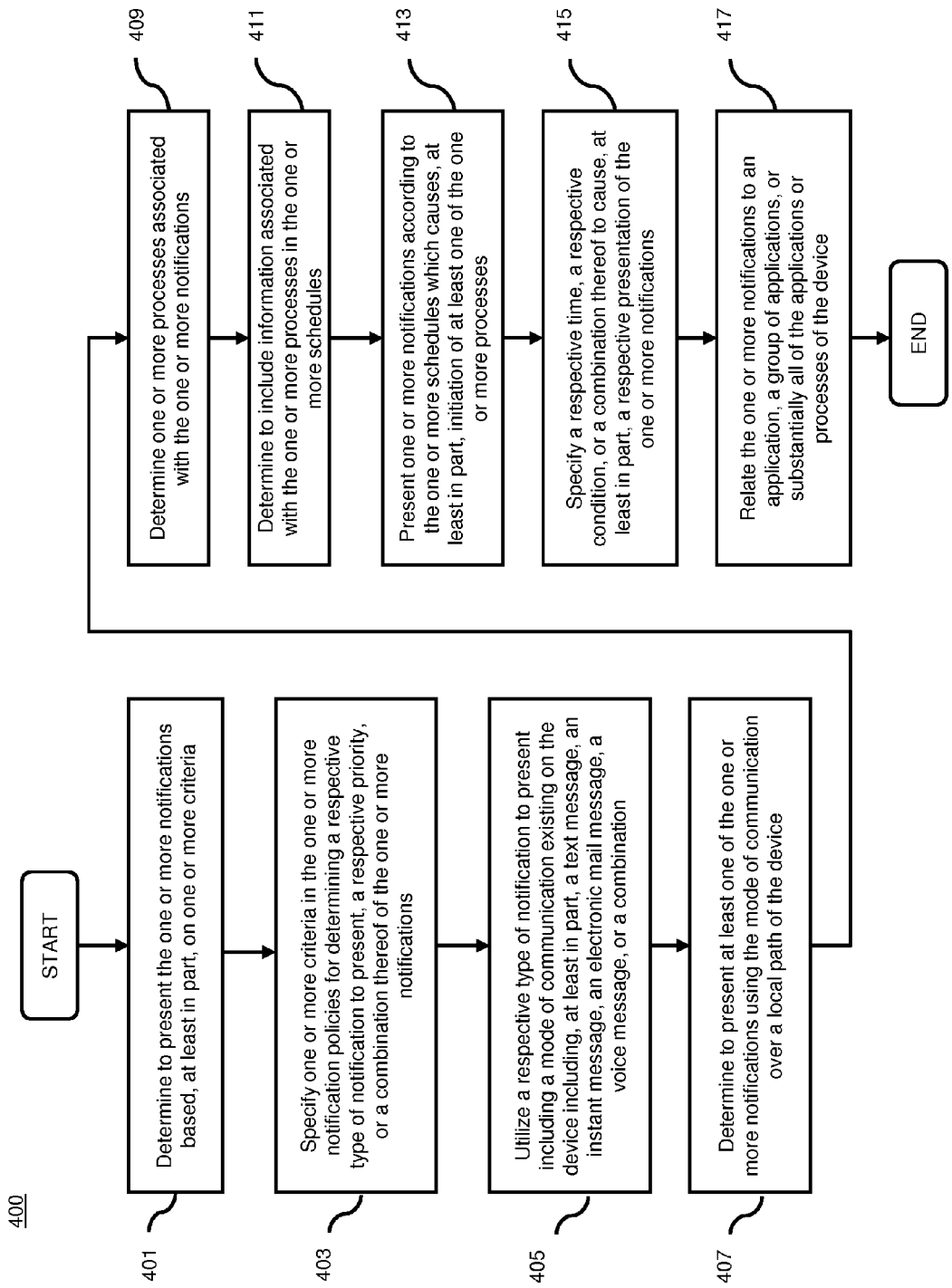
FIG. 4 is a flowchart of a process for managing and rendering one or more notifications, according to an embodiment.

FIG. 4 is flowchart of a process for managing and rendering one or more notifications for a user, according to one embodiment. In one embodiment, the control logic 205 and/or other components of the notification manager 105 performs the process 400 and is implemented in, for instance, a chip set including a processor and a memory as shown in FIG. 7. As such, the control logic 205 can provide means for accomplishing various parts of the process 400 as well as means for accomplishing other processes in conjunction with other components of the notification manager 105.

In step 401, the control logic 205 determines to render the one or more notifications based, at least in part, on one or more criteria. In step 403, the control logic 205 further utilizes the one or more criteria specified in the one or more notification policies for determining a respective type of notification to render, a respective priority, or a combination thereof of the one or more notifications.

The control logic 205 may further, as in step 405, utilize respective type of notification to render, including a mode of communication existing on the device including, at least in part, a text message, an instant message, an electronic mail message, a voice message, or a combination. In one embodiment, the notification manger can further generate the notification using any familiar mode of communication on the device (e.g., SMS, IM, email, voicemail, etc.) in place of or in addition to normal notification delivery. In various embodiments, to save network bandwidth and user device resources (i.e., battery power, network time, etc.), the notification manager may generate the notifications without accessing a communication network. In other words, the notification manager can interact with the device's native messaging, communication, and/or notification systems to directly deliver the notification in a selected mode of communication to the appropriate messaging application (e.g., messaging inbox). To the user, the notification would appear in one of the user device's communication inboxes as if it were a regular network message, whereas in implementation, the notification was locally delivered to the inbox (e.g., via a corresponding application programming interface (API)).

In step 407, as in certain embodiments, the control logic 205 determines to render at least one of the one or more notifications using the mode of communication over a local path of the device. In step 409, the control logic 205, determines one or more processes associated with the one or more notifications. In step 411, the control logic 205, further determines to include information associated with the one or more processes in the one or more schedules. Furthermore, in step 413, as in certain embodiments, the control logic 205 renders one or more notifications according to the one or more schedules which cause, at least in part, initiation of at least one of the one or more processes.

In step 415, in the one or more schedules, the control logic 205 specifies a respective time, a respective condition, or a combination thereof to cause, at least in part, a respective rendering of the one or more notifications. In step 417, as in certain embodiments, the control logic 205 wherein the one or more notifications relate to an application, a group of applications, or substantially all of the applications or processes of the device.

FIGS. 5A-5G are diagrams of user interfaces rendering notifications to a user, according to various embodiments. As discussed above, one or more notifications may be generated and rendered to a user based on one or more criteria. The notifications may comprise of announcements, confirmations, queries, and/or the like. As such, the notifications may include a query regarding data required by the one or more notifications.

Figure 5A:
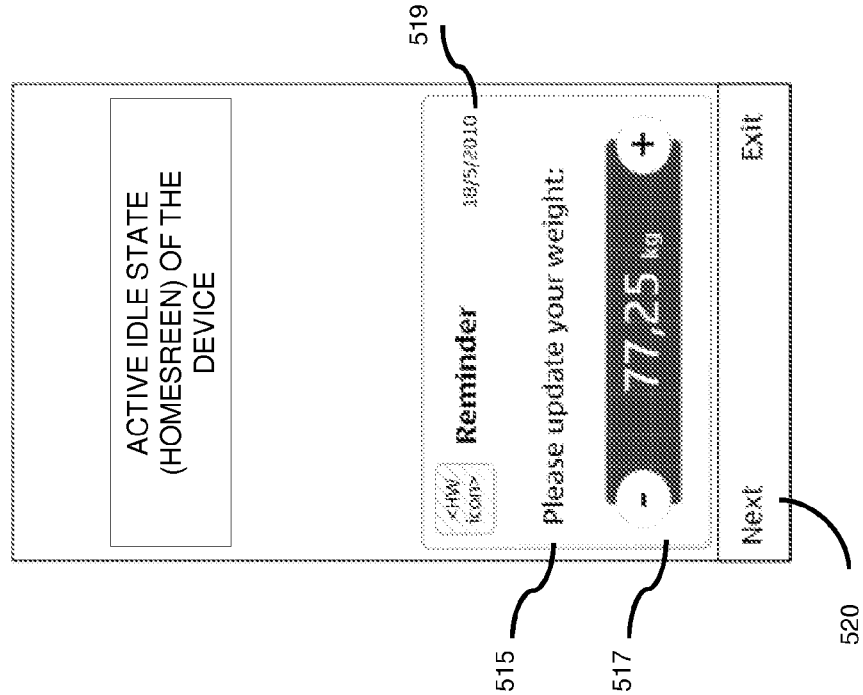
FIGS. 5A-5G are diagrams of user interfaces rendering notifications to a user, according to various embodiments.

FIG. 5A shows a user interface with a title bar 501, notification application type/name indicator 503, notification message 505, user input area 507, date indicator 509, and options buttons 511 and 513. As provided, the title bar 501 indicates the user and/or user device status. Indicator 503 status indicates the application, application type and/or application group that has generated the notification. Area 505 indicates one or more messages to the user. Indicator 507 is an input mechanism for the user to provide one or more data to one or more applications. Further, this 507 input area can be flexible and the input data/parameters area can vary according to one or more criteria (i.e., notification type, required data type, etc.). 509 shows timing information of the notification, for example, when was the notification generated. The options buttons 511 and 513 allow for the user to indicate selection of an option (e.g., by touching a physical menu button on the user device, tapping the left edge of the screen, etc.). Further, other indicators may be included in the renderings to show other parameters and/or criteria related to the one or more notifications, for example, priority level, notification group, history/log of the one or more notifications, instances of one or more notifications in the history/log, and/or the like.

Figure 5B:
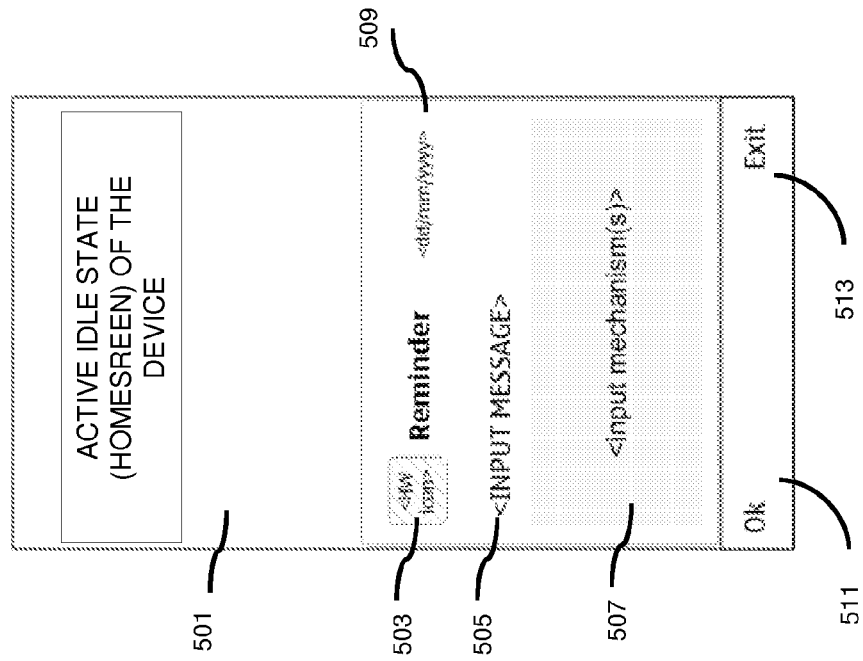

FIG. 5B shows an example of a notification with indicators 515, which renders a message to the user and prompts the user to take an action, for example, input weight measurement information. Indicator 517 renders an area for the user to input the requested information. The information can be input via one or more methods, for example, by entering text, via a pull down menu, substantially automatically via one or more sensors on the user device communicatively couple to another device, service provider and/or the like. The input mechanisms can be defined according to one or more criteria of an application and/or notification type. Indicator 519 shows timing information of the notification, for example, date the notification was created and/or the date the notification is being rendered. The option indicator 520 allows the user to proceed to a next notification in a list of notification as there may be one, if not, the user may exit the notification interface. Furthermore, if one or more notifications are skipped (i.e., not acted upon, not cleared form a list, etc.) the one or more skipped notifications are marked as skipped for possible future rendering and processing. Moreover, notifications can be queries rendered at the user device which notify a user of a reminder and whereby a user can directly input data to one or more applications, for example, a health and wellness application without the need to open the application.

Figure 5C:
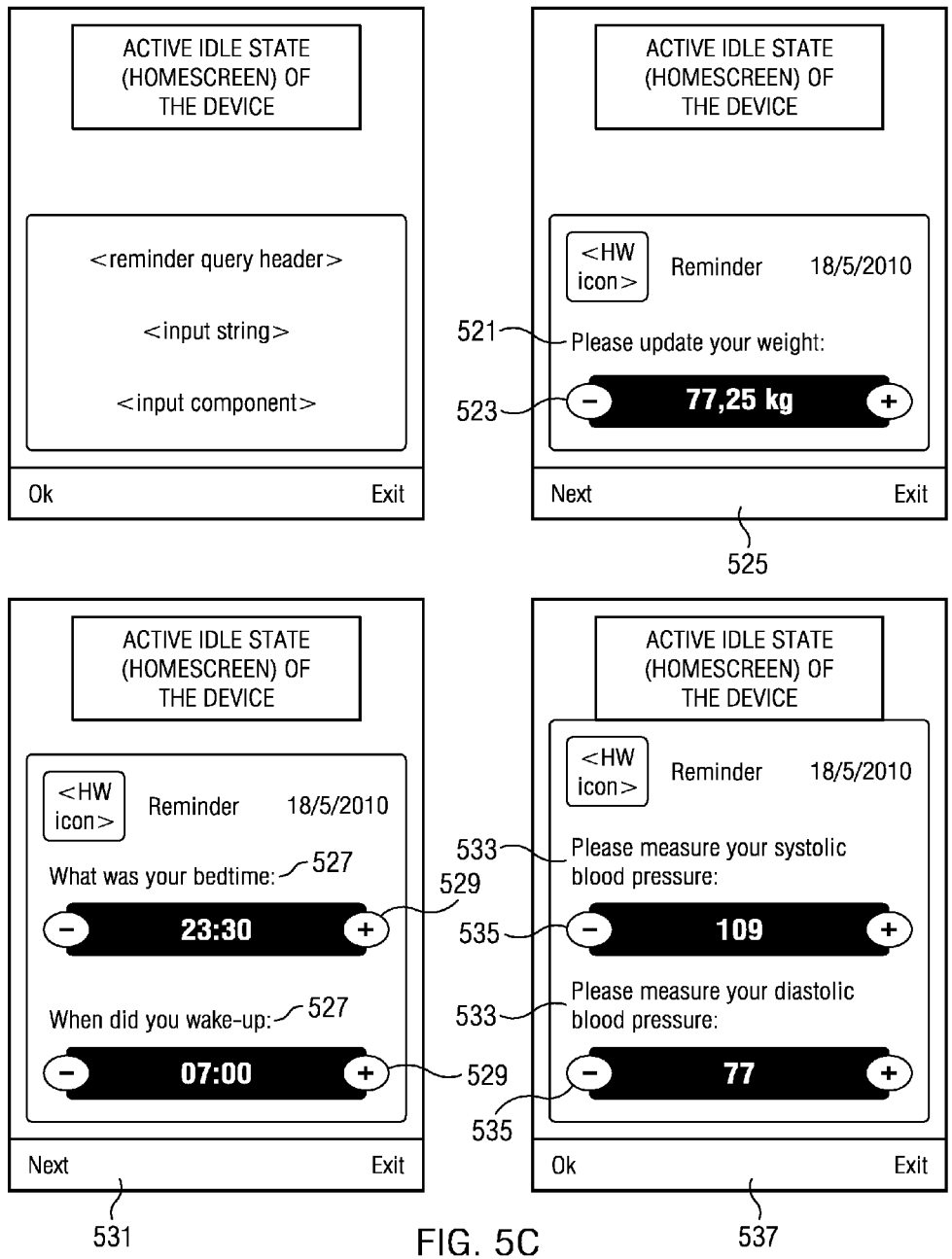

FIG. 5C shows examples of user interfaces for rendering one or more notifications. Indicators 521, 527 and 533 render one or more messages to the user. Indicators 523, 529 and 535 render one or more data which the user is required to process, review, modify and provide feedback data to one or more applications. Further, indicators 525, 531 and 537 render one or more options for the user to select. In one embodiment, one or more notifications are rendered to a user where the one or more notification can be organized by one or more criteria, for example, relevance to each other, by the one or more applications that caused creation of the one or more notifications, by priority level of the one or more notifications, by user defined criteria and/or the like. In one scenario, one or more notifications are rendered to the user whereby the user can process a notification and select to proceed to a next notification in a list. Further, it is possible that input into one or more notifications can be transferred to one or more other notifications and thereby, at least in part, process one or more notifications.

Figure 5D:
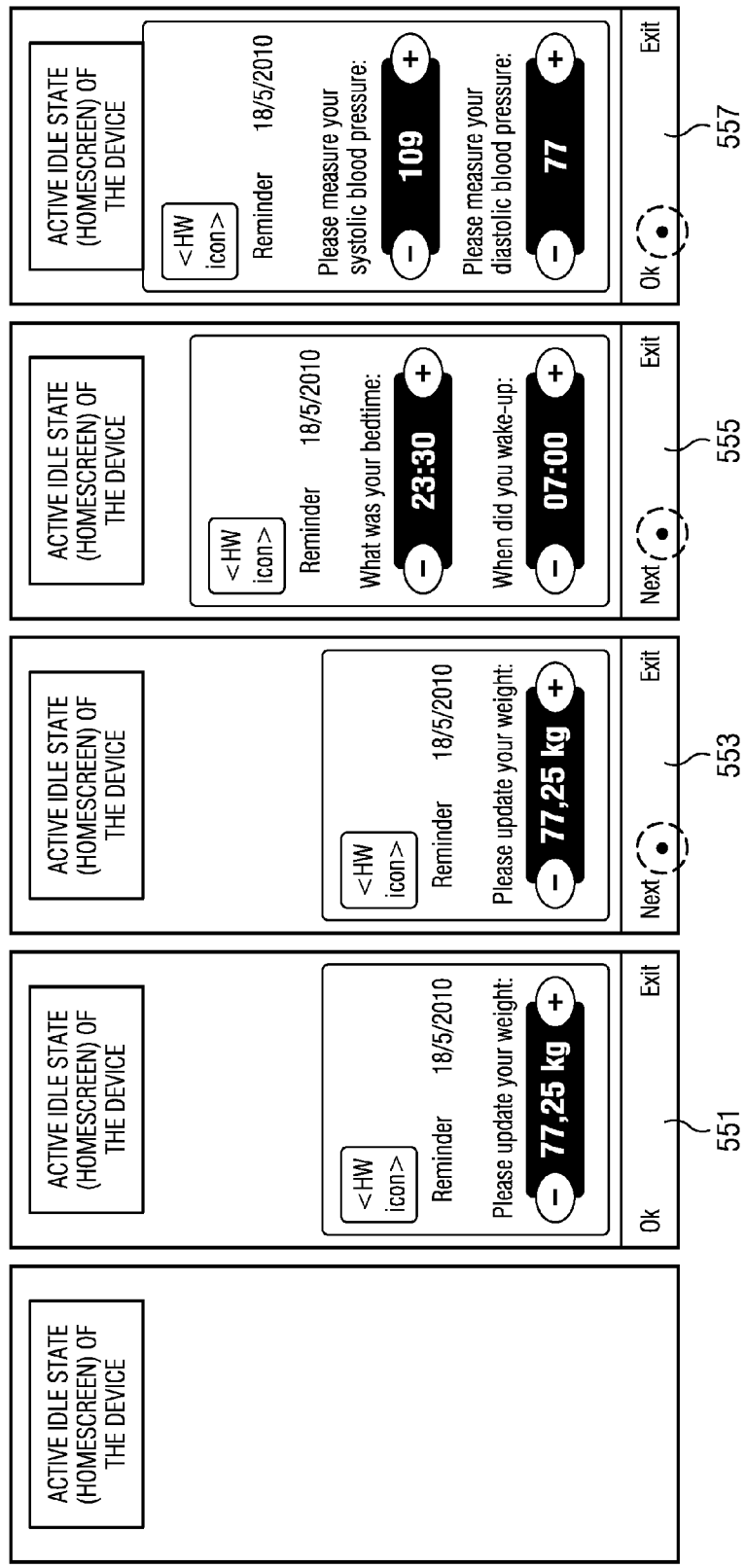

FIG. 5D shows examples of user interfaces for rendering one or more new notifications while there may be one or more pending notifications. Indicator 551 shows a notification which has not been yet processed by the user, for example the user has skipped this notification in the past and the notification is still in the list of notification to be processed. Indicator 553 renders notification 551 again for user processing, for example enter the user weight measurement. The user has the option of processing the current notification 553, proceed to the next notification, 555, and/or exit the notification session. At 555 the user has the options of processing the notification, proceed to notification 557 and/or exit. At notification 557, the notification manager renders different options to the user as 557 is substantially the last notification in a current list where the user has the options of processing the notification and/or exit the notification process.

Figure 5E:
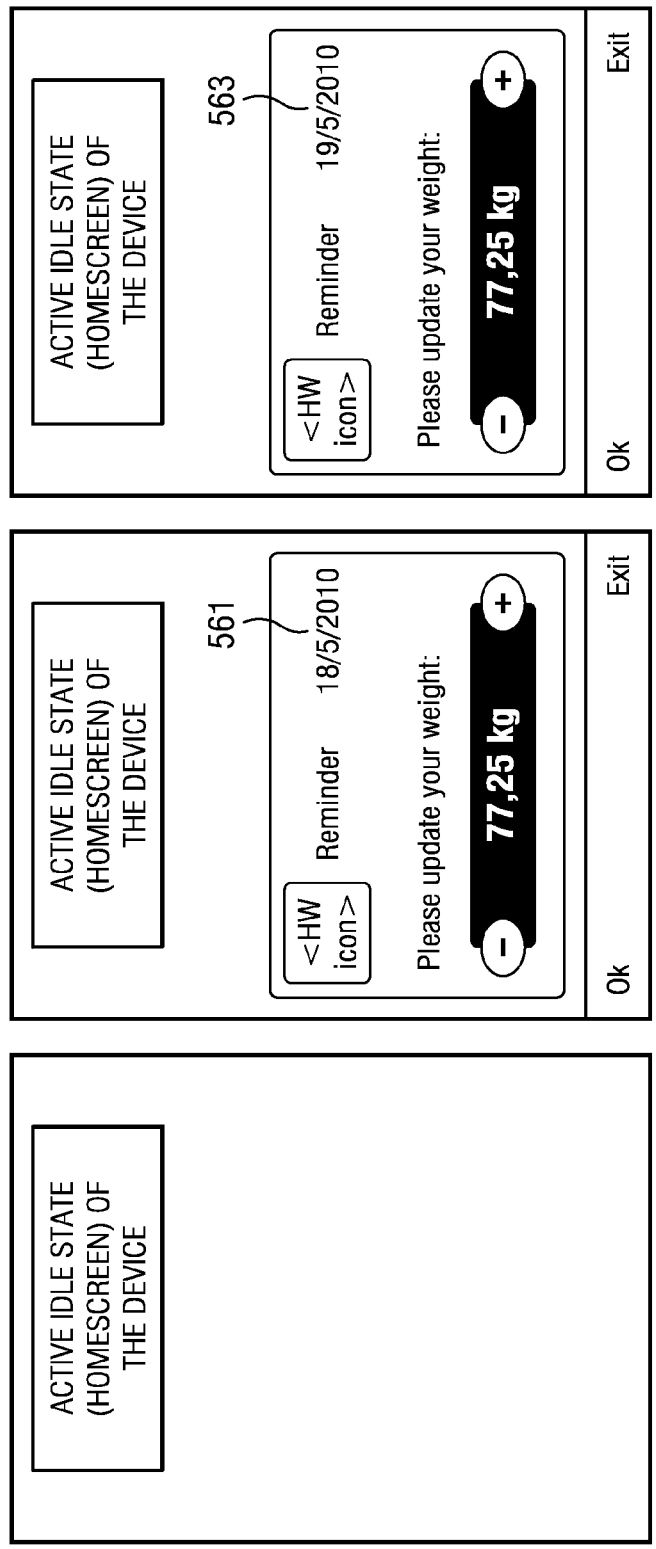

FIG. 5E shows examples of user interfaces for rendering one or more skipped notification and/or one or more new notifications. Indicator 561 shows timing information, for example data, of a skipped notification and 563 renders a substantially same notification indicating a current date. In one scenario, the user has skipped one or more notifications and has now has been rendered with another notification requesting substantially same user input as the skipped notification. Once the new notification has been processed, the skipped notification and the new notification can be, for example, marked as processed in the notification history log.

Figure 5F:
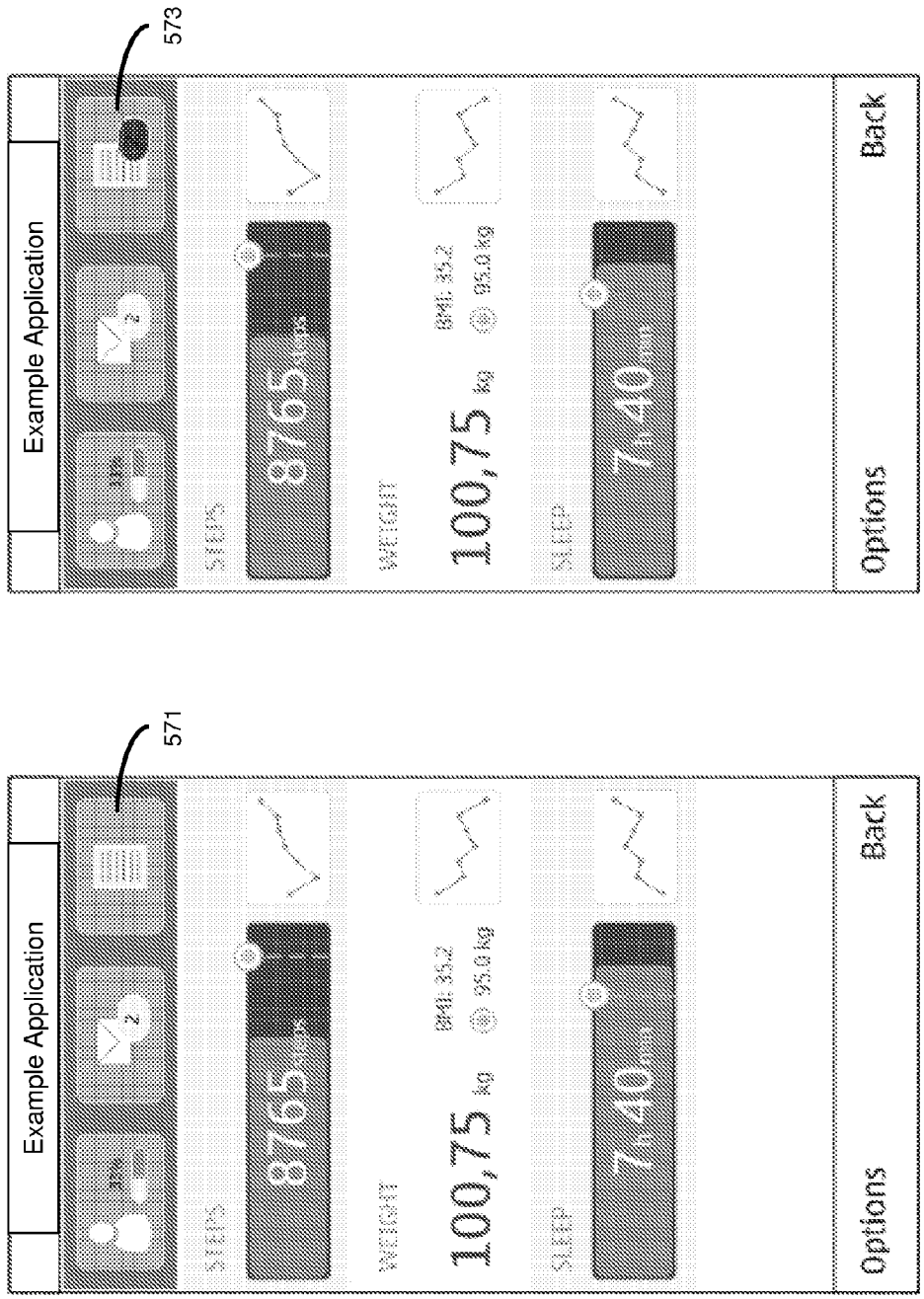

FIG. 5F shows examples of user interfaces for rendering further information on the notification log history. Indictor 571 shows a notification manager log, which indicates one or more notifications that the user skipped at active idle state without processing, for example without any user input. Further, one or more notifications which were discarded without any user inputs and the one or more notifications that triggered in the background while the user is utilizing an application, for example, a health and wellness application. Indicator 573 shows one or more new notifications, which the user can access and process while in the activity log. Further, if the user is at a different user interface view on the user device and processes one or more notifications, the one or more notifications are, for example, discarded and not added to the activity log.

Figure 5G:
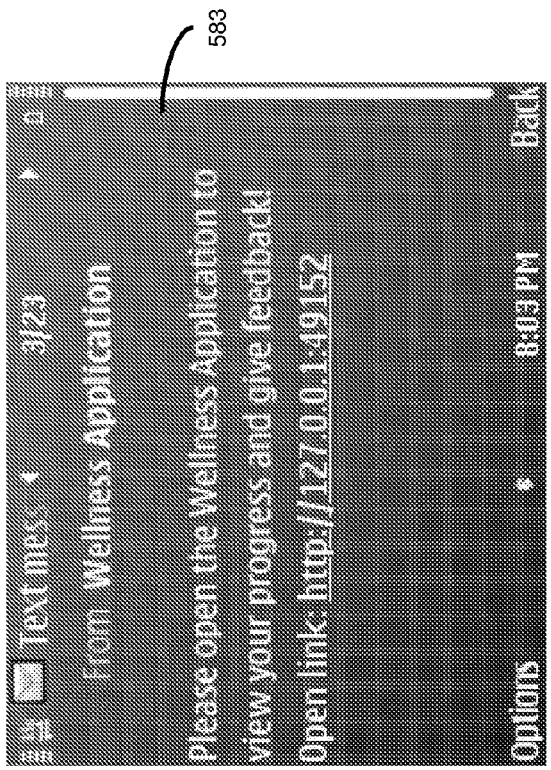
Figure 5G:
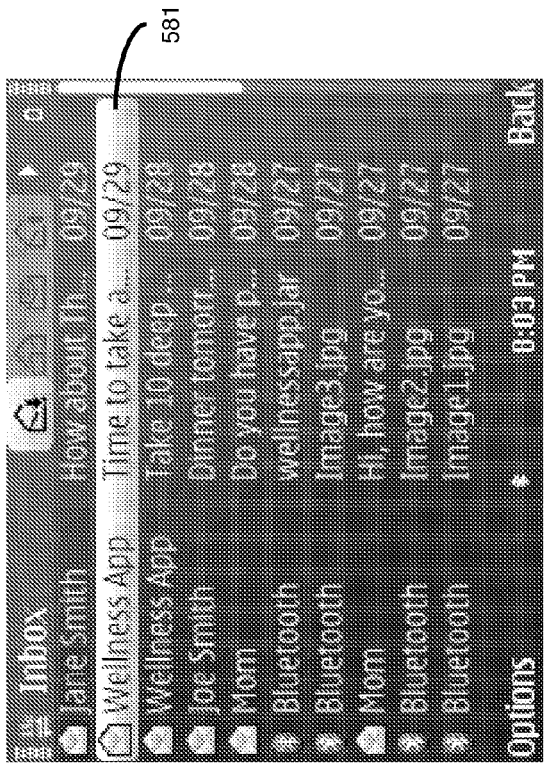

FIG. 5G shows examples of user interfaces for rendering one or more notifications to the user. As noted herein, one or more methods can be utilized to alert the user of one or more notifications, for example, audio, visual, vibration and/or the like. Further, one or more methods can be utilized to deliver and/or render the one or more notifications to the user, for example, the one or more notifications can be delivered to the user device via, SMS, email, IM, voicemail and/or the like. Furthermore, the one or more notifications can be delivered via local channels on the user device and/or via one or more components on the communication network 107. In one embodiment, one or more notifications are delivered via one or more SMS messages directly on the user device where direct delivery on the user device, potentially, does not use or require a communication network connection (i.e., cellular or data), and potentially does not cause any charges for the user. Indicator 581 shows a SMS message in a message box (i.e., inbox) on the user device, which the user can access and view its content, shown at indicator 583. In various embodiments, the indicator 581 can be a link to a notification on the user device, at a service platform, at a communication network component, at another user device and/or the like.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to manage one or more notifications as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of managing one or more notifications.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to managing one or more notifications. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for managing one or more notifications. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for managing one or more notifications, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for managing one or more notifications.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to manage one or more notifications as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of managing one or more notifications.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to manage one or more notifications. The memory 705 also stores the data associated with or generated by the execution of the inventive steps.

Figure 8:
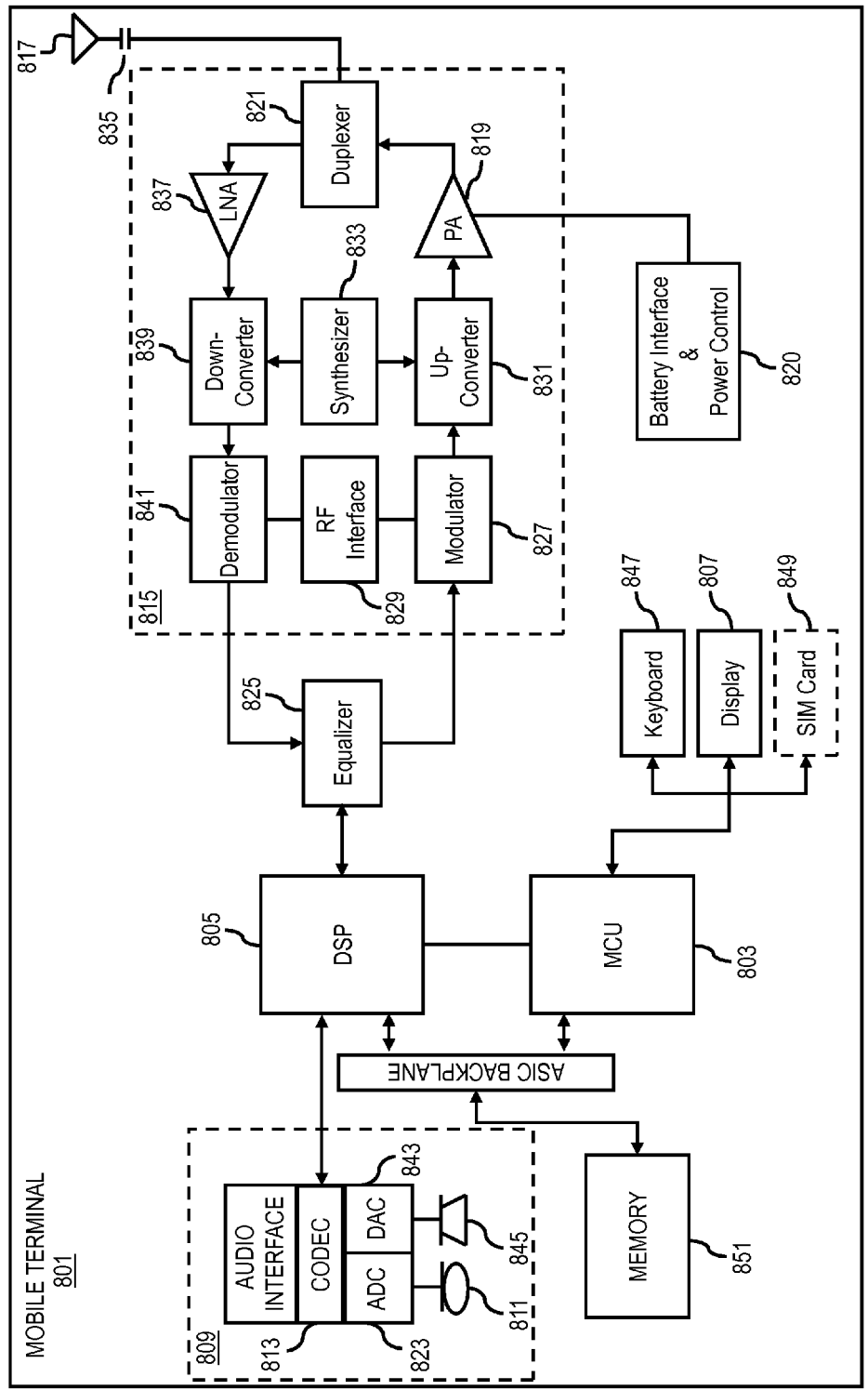
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of managing one or more notifications. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of managing one or more notifications. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to manage one or more notifications. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining to act on a request to render two or more notifications at a device;
   determining one or more notification policies associated with rendering the two or more notifications at the device; and
   determining to generate one or more schedules for rendering the two or more notifications based, at least in part, on the one or more notification policies,
   wherein the one or more notification policies include a requirement that at least one of the two or more notifications is rendered in a certain order with respect to one or more other notifications.

2. A method of claim 1, further comprising:
   determining context information associated with the request, the two or more notifications, the device, a user of the device, or a combination thereof; and

23 determining to apply the one or more notification policies to generate the one or more schedules based, at least in part, on the context information.

3. A method of claim 1, further comprising:
determining to categorize the two or more notifications into one or more groups, wherein
the one or more schedules are generated based, at least in part, on to the one or more groups.

4. A method of claim 1, further comprising:
determining to render the two or more notifications based, at least in part, on one or more criteria, wherein
the one or more criteria are specified in the one or more notification policies for determining a respective type of notification to render, a respective priority, or a combination thereof of the two or more notifications.

5. A method of claim 4, wherein
the respective type of notification to render includes a mode of communication existing on the device including, at least in part, a text message, an instant message, an electronic mail message, a voice message, or a combination.

6. A method of claim 5, further comprising:
determining to render at least one of the two or more notifications using the mode of communication over a local path of the device.

7. A method of claim 1, further comprising:
determining one or more processes associated with the two or more notifications; and
determining to include information associated with the one or more processes in the one or more schedules, wherein
a rendering of the two or more notifications according to the one or more schedules causes, at least in part, initiation of at least one of the one or more processes.

8. A method of claim 1, wherein
the one or more schedules specify a respective time, a respective condition, or a combination thereof to cause, at least in part, a respective rendering of the two or more notifications.

9. A method of claim 1, wherein
the two or more notifications relate to an application, a group of applications, or substantially all of the applications or processes of the device.

10. An apparatus comprising:
at least one processor; and
at least one memory including computer program code,
the at least one memory and the computer program code configured to, with the at least one processor, cause, at least in part, the apparatus to perform at least the following,
determine to act on a request to render two or more notifications at a device;
determine one or more notification policies associated with rendering the two or more notifications at the device; and
determine to generate one or more schedules for rendering the two or more notifications based, at least in part, on the one or more notification policies,
wherein the one or more notification policies include a requirement that at least one of the two or more notifications is rendered in a certain order with respect to one or more other notifications.

11. An apparatus of claim 10, wherein
the apparatus is further caused to:
determine context information associated with the request, the two or more notifications, the device, a user of the device, or a combination thereof, and

24 determine to apply the one or more notification policies to generate the one or more schedules based, at least in part, on the context information.

12. An apparatus of claim 10, wherein
the apparatus is further caused to:
determine to categorize the two or more notifications into one or more groups,
wherein the one or more schedules are generated based, at least in part, on to the one or more groups.

13. An apparatus of claim 10, wherein
the apparatus is further caused to:
determine to render the two or more notifications based, at least in part, on one or more criteria,
wherein the one or more criteria are specified in the one or more notification policies for determining a respective type of notification to render, a respective priority, or a combination thereof of the two or more notifications.

14. An apparatus of claim 13, wherein
the respective type of notification to render includes a mode of communication existing on the device including, at least in part, a text message, an instant message, an electronic mail message, a voice message, or a combination.

15. An apparatus of claim 14, wherein
the apparatus is further caused to:
determine to render at least one of the two or more notifications using the mode of communication over a local path of the device.

16. An apparatus of claim 10, wherein
the apparatus is further caused to:
determine one or more processes associated with the two or more notifications; and
determine to include information associated with the one or more processes in the one or more schedules, wherein
a rendering of the two or more notifications according to the one or more schedules causes, at least in part, initiation of at least one of the one or more processes.

17. An apparatus of claim 10, wherein
the one or more schedules specify a respective time, a respective condition, or a combination thereof to cause, at least in part, a respective rendering of the two or more notifications.

18. An apparatus of claim 10, wherein
the two or more notifications relate to an application, a group of applications, or substantially all of the applications or processes of the device.

19. A computer-readable storage medium carrying one or more sequences of one or more instructions which, when executed by one or more processors, cause, at least in part, an apparatus to at least perform the following:
determine to act on a request to render two or more notifications at a device;
determine one or more notification policies associated with rendering the two or more notifications at the device; and
determine to generate one or more schedules for rendering the two or more notifications based, at least in part, on the one or more notification policies,
wherein the one or more notification policies include a requirement that at least one of the two or more notifications is rendered in a certain order with respect to one or more other notifications.

20. A computer-readable storage medium of claim 19, wherein
the apparatus is caused, at least in part, to further perform:

determine context information associated with the request, the two or more notifications, the device, a user of the device, or a combination thereof and determine to apply the one or more notification policies to generate the one or more schedules based, at least in part, on the context information.

\* \* \* \* \*